United States Patent [19]
Sawert et al.

[11] Patent Number: 5,647,330
[45] Date of Patent: Jul. 15, 1997

[54] FUEL SENDER FOR MOTOR VEHICLE

[75] Inventors: Ulf Sawert, Grand Blanc; Grady Donald Jones, Sr., Burton; Dale Richard Jones, Flushing; Bruce Albert Kuehnemund, Flushing; Randall Lee Dockery, Flushing, all of Mich.

[73] Assignee: General Motors Corporation, Detroit, Mich.

[21] Appl. No.: 672,851

[22] Filed: Jul. 25, 1996

[51] Int. Cl.$^6$ .................................................. F02M 37/04
[52] U.S. Cl. .............................. 123/509; 137/571
[58] Field of Search .................... 123/509, 510, 123/511, 514; 137/571, 574, 576, 587

[56] References Cited

U.S. PATENT DOCUMENTS

| | | | |
|---|---|---|---|
| 5,058,557 | 10/1991 | Frank et al. | 123/509 |
| 5,146,901 | 9/1992 | Jones | 123/509 |
| 5,195,494 | 3/1993 | Tuckey | 123/514 |
| 5,341,842 | 8/1994 | Chih et al. | 137/576 |
| 5,456,235 | 10/1995 | Porter | 123/509 |
| 5,482,021 | 1/1996 | Roche | 123/509 |
| 5,564,396 | 10/1996 | Kleppner et al. | 123/509 |

*Primary Examiner*—Thomas N. Moulis
*Attorney, Agent, or Firm*—Saul Schwartz

[57] ABSTRACT

A fuel sender including a container in a fuel tank of a motor vehicle and, in the container, a filter, a fuel pump, a jet pump, and a pressure regulator. An upstream side of the filter and the fuel pump are connected through a first passage in a first end wall of the container. A downstream side of the filter is connected to an interior volume of the container through a convoluted second passage on a second end wall of the container. A pressure regulator on the second end wall of the container maintains fuel pressure at a substantially constant magnitude by variably restricting flow through the second passage. A venturi throat in the second passage aspirates fuel from the fuel tank into the container. The efficiency of the jet pump is maximized by minimizing the length of the convoluted second passage. Vibration isolating seals minimize the transfer of vibrations and pressure pulsations to the container. In a preferred embodiment, the filter has electrically conductive elements which are connected to a ground circuit of the motor vehicle for protection against static discharge.

3 Claims, 5 Drawing Sheets

5,647,330

FUEL SENDER FOR MOTOR VEHICLE

FIELD OF THE INVENTION

This invention relates to a fuel sender in a fuel tank of a motor vehicle.

BACKGROUND OF THE INVENTION

U.S. Pat. No. 5,195,494 describes a fuel sender in a fuel tank of a motor vehicle including a container, a fuel pump in the container, a filter in the container, a pressure regulator in the container, and flexible hoses between the fuel pump, the filter, and the pressure regulator. Fuel from inside the container is pumped by the fuel pump through the filter to a fuel rail of a fuel injection system of the motor vehicle. The pressure regulator recirculates a fraction of the discharge of the fuel pump directly back into the container to maintain the pressure of the fuel downstream of the filter at a constant differential relative to a manifold pressure of a motor of the motor vehicle. International Patent Application No. WO 95/29075 describes a fuel sender in a fuel tank of a motor vehicle including a container, an annular filter in the container, a fuel pump in the center of the filter, and a flexible hose between the fuel pump and the filter. A publicly displayed fuel sender similar to that described in the aforesaid International Patent Application No. WO 95/29075 includes a pressure regulator in the container and a jet pump which uses the fraction of the fuel recirculated by the pressure regulator to aspirate new fuel from the fuel tank into the container.

SUMMARY OF THE INVENTION

This invention is a new and improved fuel sender for a motor vehicle including a container in a fuel tank of the motor vehicle and, in the container, a filter, a fuel pump, a jet pump, and a pressure regulator. An upstream side of the filter and the fuel pump are connected through a first passage in a first end wall of the container which accommodates close juxtaposition of the filter and the fuel pump. A downstream side of the filter is connected to an interior volume of the container through a convoluted second passage on a second end wall of the container. A pressure regulator in a socket on the second end wall of the container maintains fuel pressure on the downstream side of the filter at a substantially constant magnitude by variably restricting flow through the convoluted second passage. A venturi throat in the second passage accelerates the flow of fuel to aspirate new fuel from the fuel tank into the container. The efficiency of the jet pump is maximized by minimizing the length of the convoluted second passage from the filter to the venturi throat to minimize flow losses upstream of the venturi throat. Flexible annular seals between the filter and each of the first and second end walls of the container and between the fuel pump and the first end wall of the container minimize the transfer of vibrations and pressure pulsations to the container. In a preferred embodiment, the filter has electrically conductive housing elements which are connected to a ground circuit of the motor vehicle for protection against static discharge.

DESCRIPTION OF THE PREFERRED EMBODIMENT

Figure 1:
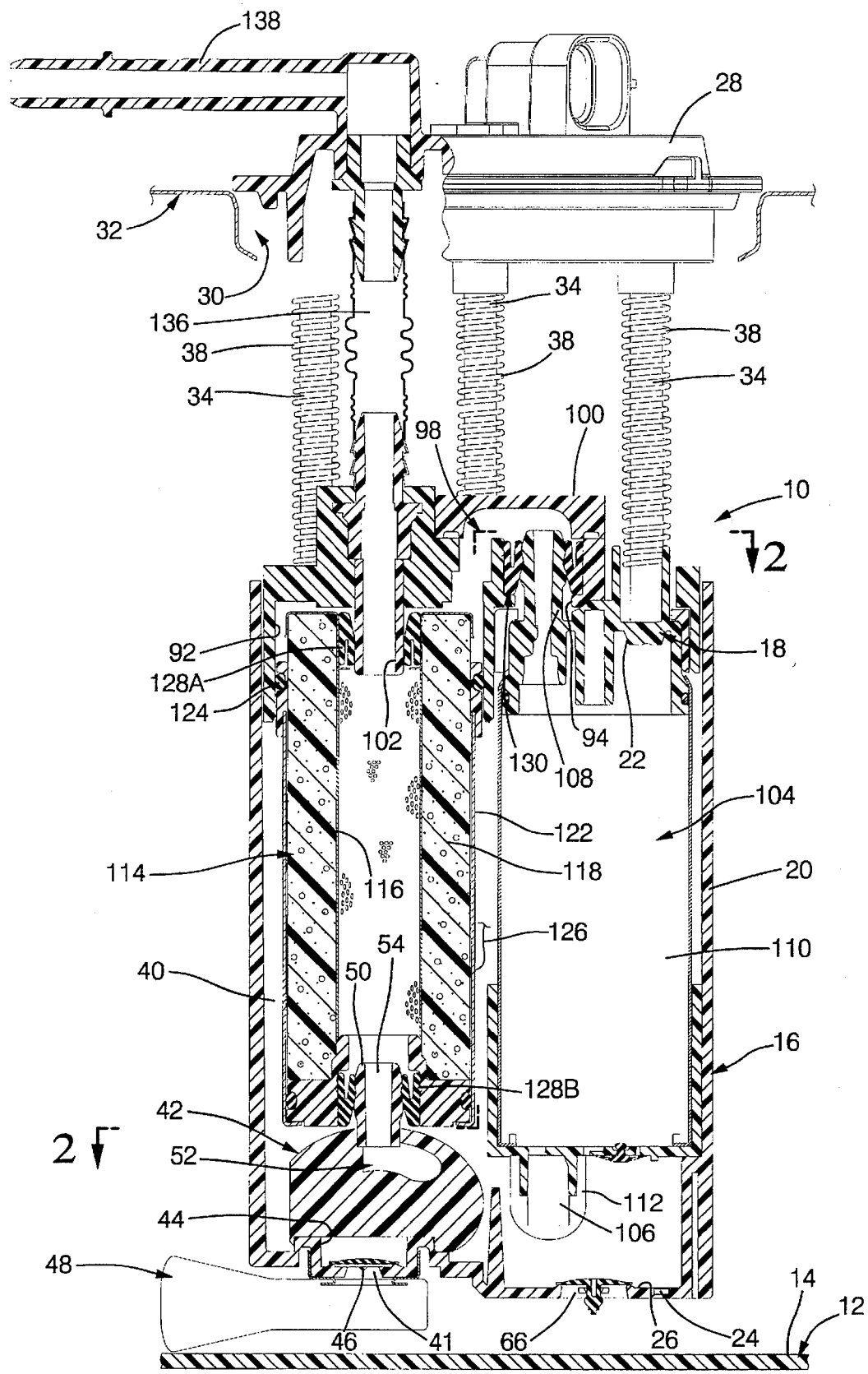
FIG. 1 is a partially broken-away elevational view of a fuel sender according to this invention.

A fuel sender 10 according to this invention is disposed in a fuel tank 12 of a motor vehicle, not shown, near a bottom 14 of the tank. The fuel sender 10 includes a plastic container 16 and a cover 18 which snaps rigidly onto a generally cylindrical side wall 20 of the container. The cover 18 defines a first end wall 22 of the container opposite a bottom 24 of the latter integral with the side wall 20, which bottom defines a second end wall 26 of the container. A cap 28 of the fuel sender 10 in an access port 30 in a top 32 of the fuel tank is connected to the cover 18 by a plurality of struts 34 which slide vertically in a corresponding plurality of sockets 36, FIG. 6, in the cover. A plurality of springs 38 around respective ones of the struts bias the container toward the bottom 14 of the fuel tank. The first and second end walls 22, 26 and the side wall 20 of the container cooperate in defining an interior volume 40 of the container.

A molded plastic housing 42 in the interior volume 40 of the container is rigidly attached to the second end wall 26 over an inlet port 44 in the bottom 24 of the container. The housing 42 may be molded integrally with the bottom 24 and the side wall 20. An umbrella valve 46 on bottom 24 in the inlet port 44 permits flow of new fuel from the fuel tank toward the interior volume 40 of the container 16 and blocks fuel flow in the opposite direction. A strainer 48 for new fuel entering the container 16 is disposed between the bottom 24 of the container and the bottom 14 of the fuel tank.

The plastic housing 42 includes a tubular boss 50 parallel to a longitudinal centerline of the container 16 and a convoluted passage 52 having a first or upstream end 54 at the tip of the tubular boss 50 and a second or downstream end 56 exposed to the interior volume 40 of the container. Between its first and second ends 54, 56, the convoluted passage 52 intersects a bottom surface 58, FIG. 3, of a regulator socket 60 in the plastic housing. The convoluted passage 52 narrows at a venturi throat 62 aligned with the second end 56 of the convoluted passage and has a perforation 64 adjacent the venturi throat which affords communication between the inlet port 44 and the convoluted passage 52. A gravity feed passage 66, FIG. 1, in the bottom 24 communicates between the tank 12 and the interior volume 40.

Figure 2:
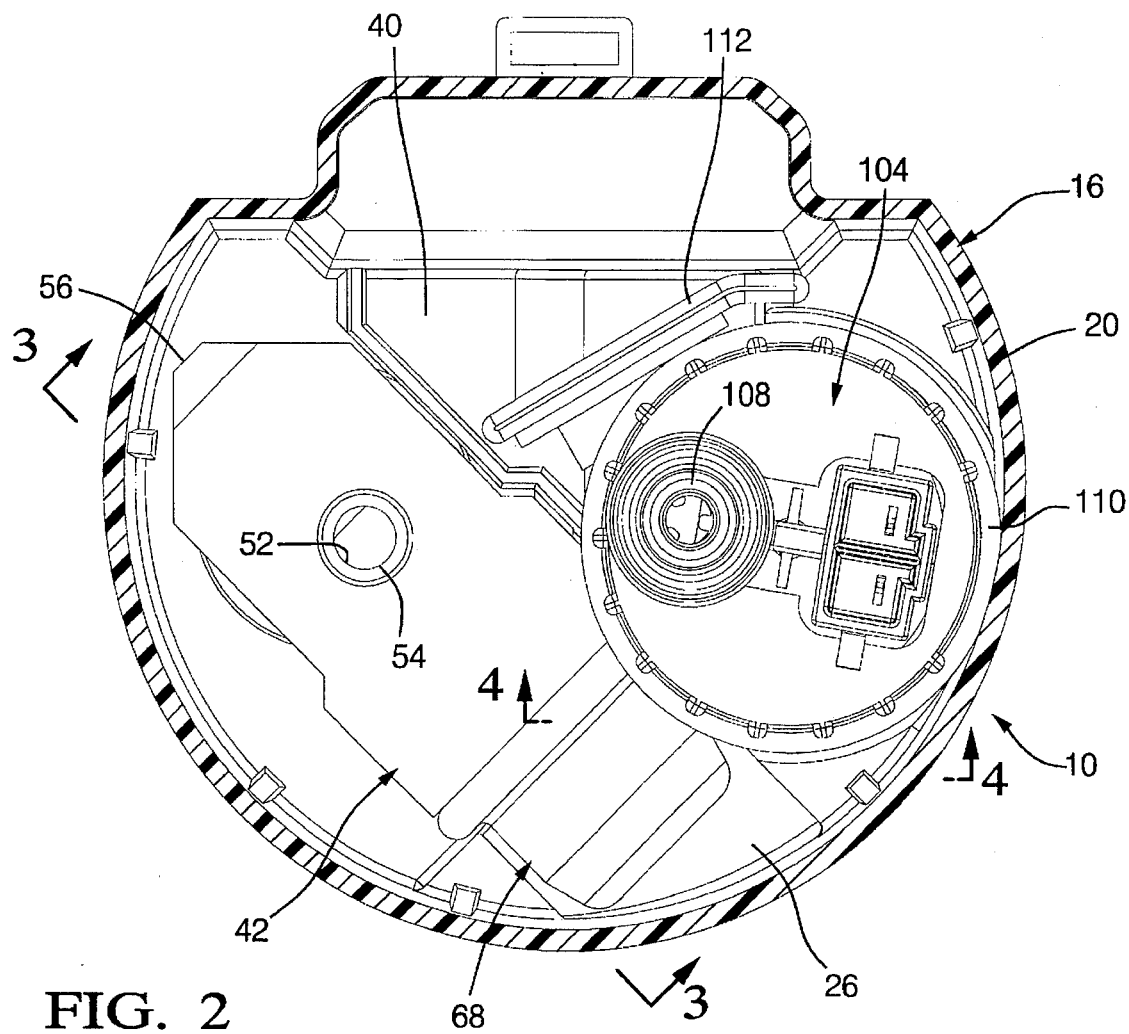
FIG. 2 is a sectional view taken generally along the plane indicated by lines 2—2 in FIG. 1.
Figure 5:
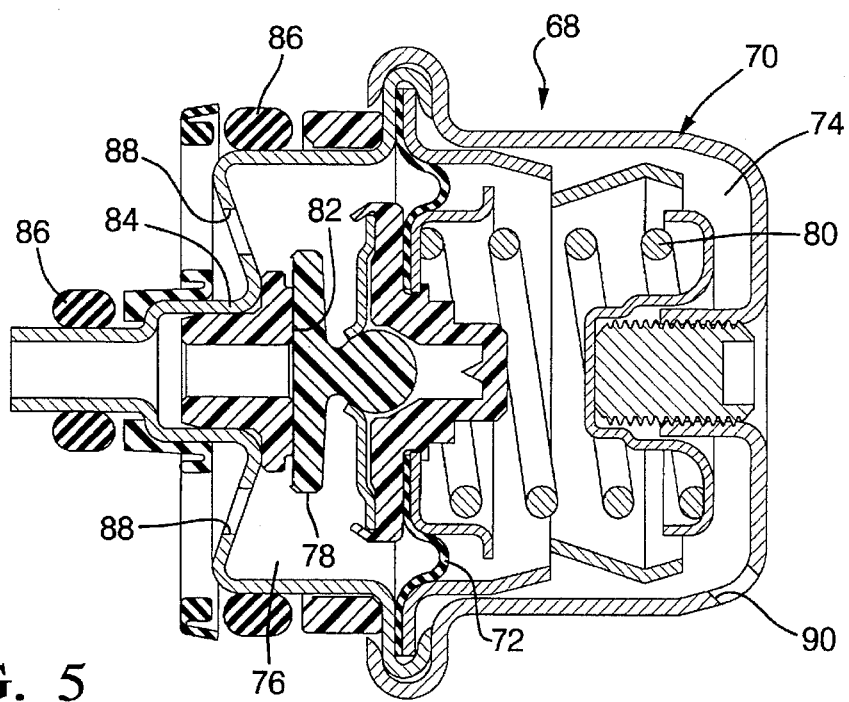
FIG. 5 is an enlarged sectional view of a pressure regulator of the fuel sender according to this invention.
Figure 3:
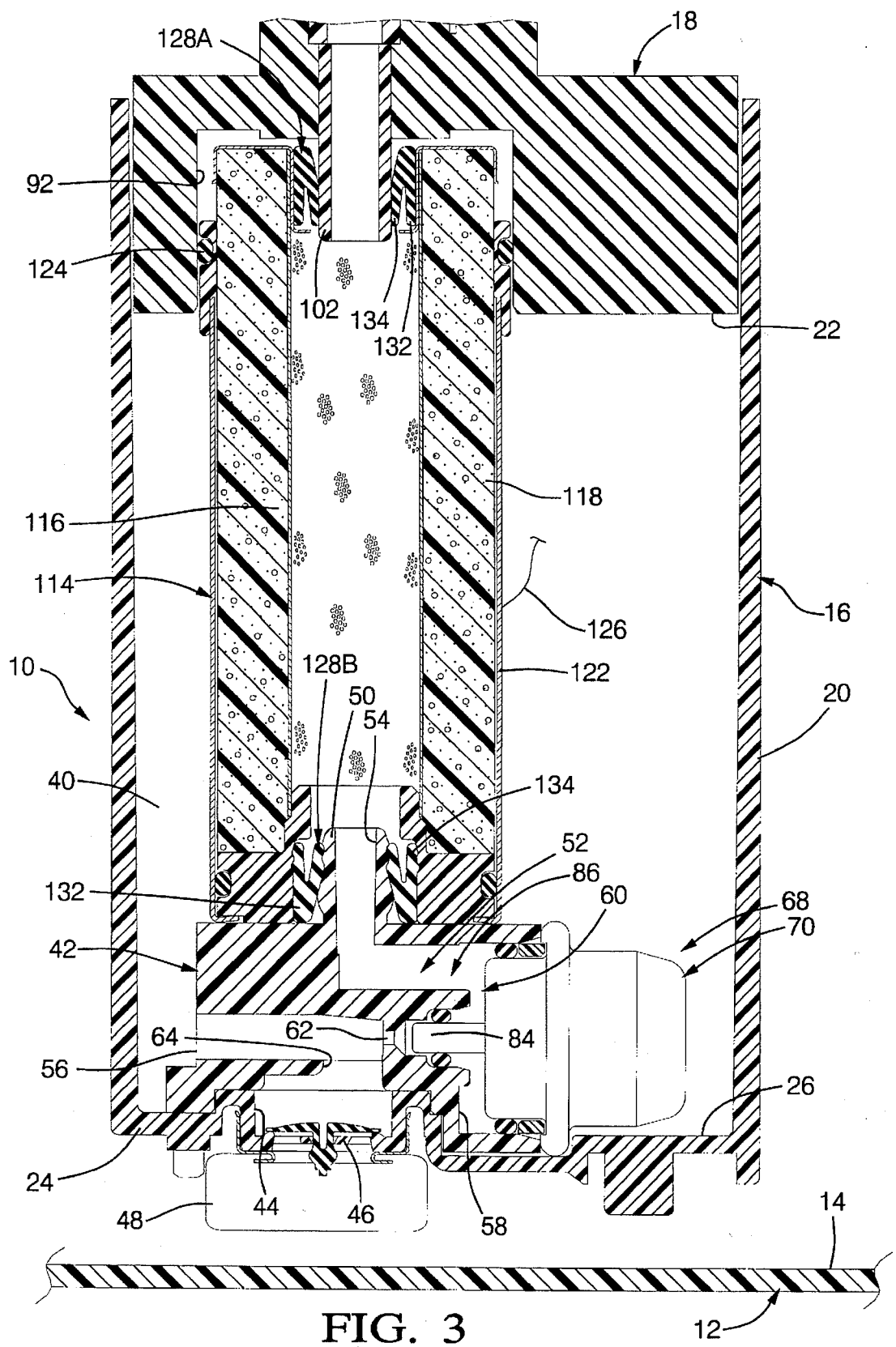
FIG. 3 is a sectional view taken generally along the plane indicated by lines 3—3 in FIG. 2.

As seen best in FIGS. 2, 3 and 5, a pressure regulator 68 of the fuel sender 10 includes a shell 70 divided internally by a flexible diaphragm 72 into a first chamber 74 and a second chamber 76. A valve element 78 attached to the flexible diaphragm is biased by a spring 80 in the first chamber 74 toward a closed position, FIG. 5, on a valve seat 82 at one end of a tubular stem 84 of the shell 70. The shell 70 seats in the regulator socket 60 in the housing 42 on the second end wall 26 of the container with the stem 84 in the convoluted passage 52 upstream of the venturi throat 62. A plurality of seal rings 86 prevent leakage between the shell 70 and stem 84 of the regulator and the housing 42.

The second chamber 76 is exposed to fluid pressure in the convoluted passage 52 upstream of the venturi throat 62 through a plurality of perforations 88 in the shell 70. The first chamber 74 is vented to the fluid pressure prevailing in the interior volume 40 of the container 16, i.e., substantially atmospheric pressure, through a perforation 90 in the shell 70. In the closed position of the valve element 78, FIG. 5, the convoluted passage 52 is blocked. In any of a plurality of open positions of the valve element 78, not shown, removed from the valve seat 82, the convoluted passage 52 is progressively more unblocked.

The first end wall 22 of the container 16 has a generally cylindrical filter socket 92 therein facing the second end wall 26 and an aperture 94 at the bottom of cylindrical counterbore 96 facing away from the second end wall. A short passage 98 in the cover 18 communicates between the counterbore 96 and the bottom of the filter socket 92. The short passage 98 may be completely molded into the cover 18 or partially molded and closed by an insert 100, FIG. 1, on the cover. A tubular boss 102 in the center of the filter socket 92 rigidly attached to the cover 18 is aligned with the tubular boss 50 on the plastic housing 42 parallel to the longitudinal centerline of the container 16.

A fuel pump assembly 104 in the container 16 between the first and second end walls thereof has a tubular inlet boss 106 at one end and a tubular discharge boss 108 at the other end in the aperture 94 in the first end wall 22 of the container. The fuel pump assembly is conventional and may be as described in detail in U.S. Pat. 4,718,827, issued Jan. 12, 1988 and assigned to the assignee of this invention, incorporated herein by reference. The fuel pump assembly 104 has an electric motor and a pump, not shown, within a cylindrical metal housing 110. When the electric motor is on, fuel is drawn from the interior volume 40 of the container into the pump through the tubular inlet boss 106 and discharged into the short passage 98 at high pressure through the tubular discharge boss 108. A strainer 112 in the interior volume 40 attached to the inlet boss 106 strains fuel entering the inlet boss from the interior volume of the container.

As best seen in FIG. 3, a filter assembly 114 in the container 16 includes a perforated center tube 116, an annular filter element 118 around the center tube, and a shell 122 around the filter element. A seal ring 124 separates the bottom of the filter socket from the interior volume 40 of the container around the shell 122. The center tube 116, and the shell 122 are made of electrically conductive material, e.g., steel, and are connected to the ground circuit of the motor vehicle through a conductor 126 attached to the filter and to a schematically represented wiring harness, not shown, of the motor vehicle outside of the container 16.

Figure 4:
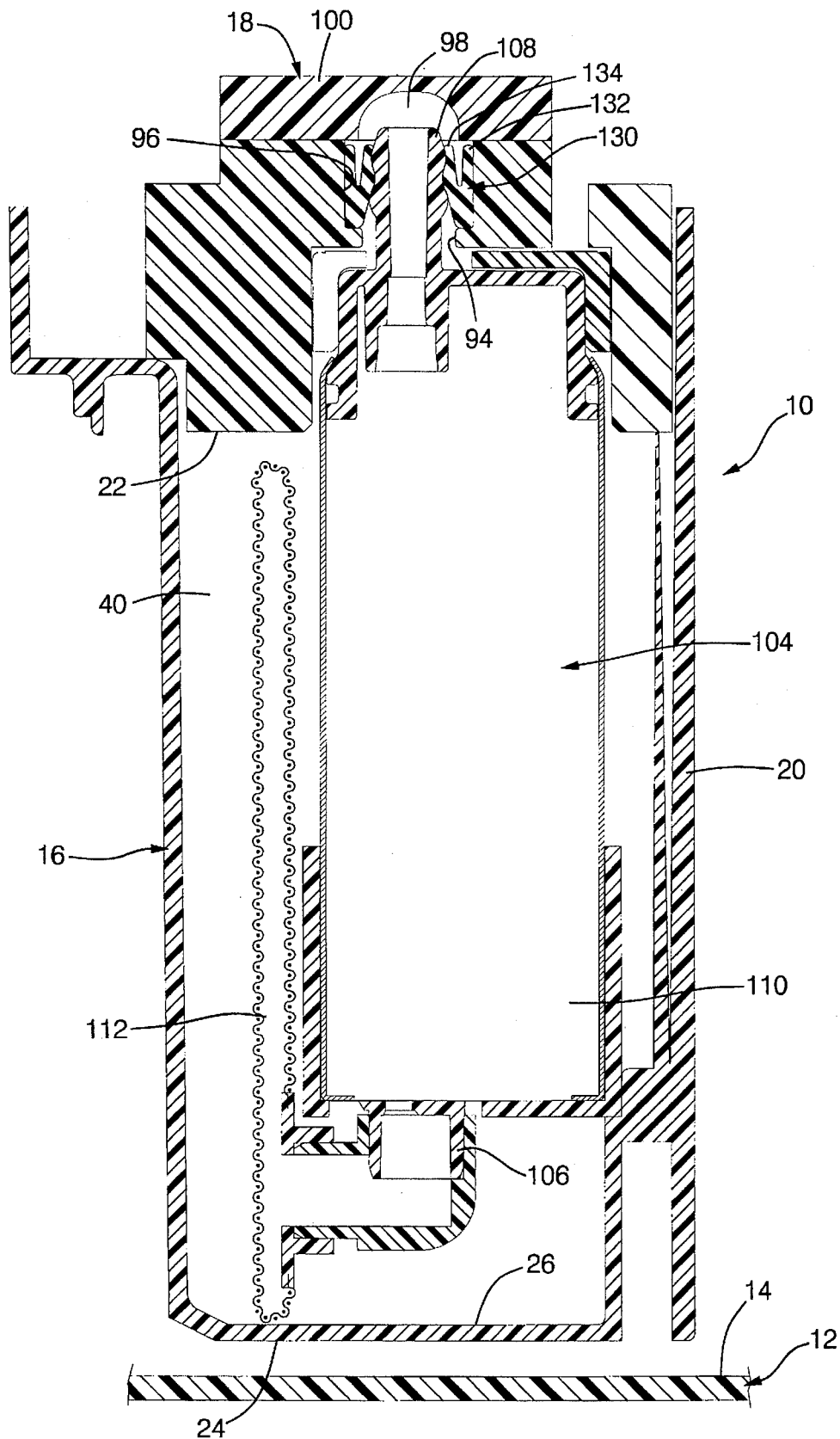
FIG. 4 is a sectional view taken generally along the plane indicated by lines 4—4 in FIG. 2.
Figure 6:
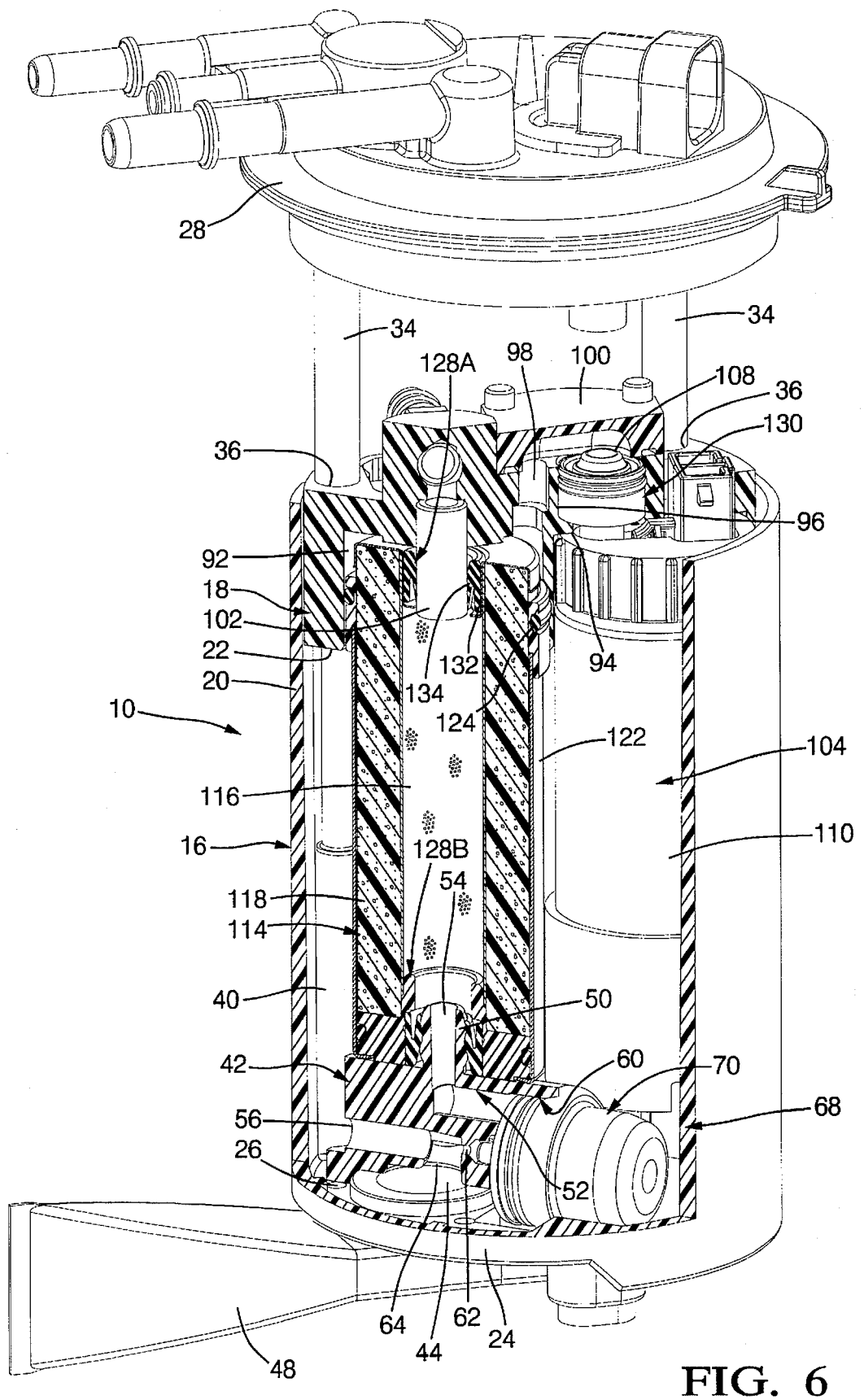
FIG. 6 is a partially broken-away perspective view of the fuel sender according to this invention.

A pair of vibration isolating seals 128A, 128B are interposed between the center tube 116 and the respective ones of the cover 18 and the plastic housing 42. A third vibration isolating seal 130, FIG. 1, 4, and 6 is interposed between the side of the counterbore 96 in the cover 18 and the discharge boss 108 on the fuel pump assembly. Each of the vibration isolating seals 128A, 128B, 130 is a molded elastomeric element having a ring-shaped body 132 and an integral flexible annular lip 134. The ring-shaped bodies 132 of the seals 128A, 128B are each rigidly attached to the center tube 116 of the filter. The flexible lips 134 of the seals 128A, 128B tightly engage the tubular bosses 102, 50, respectively, to prevent fluid leakage between the filter and the outside surface of each of the tubular bosses 102, 50. Similarly, the ring-shaped body 132 of the seal 130 is rigidly attached to the cover 18 in the counterbore 96 with the flexible lip 134 of the seal 130 tightly engaging the discharge boss 108 to prevent leakage of high pressure fuel between the cover 18 and the outside surface of the discharge boss.

In operation, when the electric motor of the fuel pump assembly 104 is on, fuel is drawn from the interior volume 40 of the container into the pump through the inlet boss 106 and discharged at high pressure into the short passage 98 through the discharge boss 108. From the short passage 98, the high pressure fuel flows into the filter socket 92 and from there through the filter element 118 into the center tube 116. From the center tube, fuel at high pressure flows out of the fuel sender through the tubular boss 102 which is connected to the aforesaid fuel rail through a flexible hose 136 inside the fuel tank and a connector 138 on the cap 28. Static electricity which collects on the filter assembly 114 is conducted to ground by the conductor 126.

Concurrently, fuel at high pressure reacts against the diaphragm 72 of the pressure regulator 68 and shifts the diaphragm and the valve element 78 to an open position of the latter in which a fraction of the discharge of the fuel pump assembly is recirculated directly back into the interior volume 40 of the container through the second end 56 of the convoluted passage 52 to maintain the pressure in the center tube 116 at a magnitude predetermined by the spring rate of the spring 80 of the pressure regulator. As the fraction of the discharge of the fuel pump assembly consumed by the motor changes, the pressure in the second chamber 76 of the pressure regulator varies inversely to vary the position of the valve element 78 relative to the valve seat 82 and the quantity of high pressure fuel recirculated to the interior volume 40.

In the convoluted passage 52, the recirculated fraction of the discharge of the fuel pump assembly accelerates through the venturi throat 62 and issues therefrom as a high velocity jet which induces a zone of low pressure at the perforation 64. The low pressure zone aspirates a flow of new fuel through the inlet port 44 from the fuel tank 12 into the convoluted passage 52 and, from there, into the interior volume 40 of the container 16 through the second end 56 of the convoluted passage whereby the interior volume 40 is actively replenished. The interior volume 40 is passively replenished by gravity-induced fuel flow through the gravity feed passage 66 when the level of fuel in the fuel tank is above the gravity feed passage.

The short passage 98 in the first end wall 22 of the container and the short convoluted passage 52 in the second end wall 26 of the container 16 are important features of this invention because such short passages accommodate close juxtaposition of the fuel pump assembly 104, the filter assembly 114, and the jet pump defined by the venturi throat 62 and eliminate hoses which add expense to a fuel sender. Close juxtaposition of the fuel pump assembly 104, the filter assembly 114, and the jet pump minimizes flow losses in the short passages. Further, close juxtaposition of the filter assembly 114 and the jet pump defined by the venturi throat 62 maximizes the pulse damping effect achieved by series connection of the fluid resistance of the filter element 118 and the fluid capacitance of the pressure regulator 68 attributable to the resilient compliance of the diaphragm 72 of the latter.

What is claimed is:

1. A fuel sender in a fuel tank of a motor vehicle comprising:

a container having a first end wall and a second end wall each rigidly attached to a continuous side wall of said container and cooperating therewith in defining an interior volume of said container, a filter socket in said first end wall of said container, a first passage means on said first end wall from said filter socket to a fuel pump aperture in said first end wall, a first tubular boss in the center of said filter socket parallel to a longitudinal centerline of said container, a second tubular boss on said second end wall of said container parallel to said longitudinal centerline of said container aligned with said first tubular boss, a second passage means on said second end wall from a tip of said second tubular boss to said interior volume of said container, a regulator socket on said second end wall of said container intersecting said second passage means, a pressure regulator means in said regulator socket operative to block said second passage means when fluid pressure in said second passage means upstream of said regulator socket is below a predetermined pressure and to progressively more fully open said second passage means when fluid pressure in said second passage means upstream of said regulator socket is above said predetermined pressure, a venturi throat means on said second end wall downstream of said regulator socket responsive to fluid flow in said second passage to aspirate fuel from said fuel tank into said interior volume of said container, a filter assembly including a center tube around each of said first and said second tubular bosses and a filter element around said center tube and an end plate in said filter socket and a shell around said filter element, a pair of vibration isolating seals means between said center tube and each of said first and said second tubular bosses operative to prevent fuel leakage from said center tube into said interior volume of said container while substantially preventing transmission of vibrations and pressure pulses to said first and said second tubular bosses, a seal means between said filter socket and said filter assembly operative to confine fuel flow from said first passage to flow through said filter element into said center tube of said filter assembly, a fuel pump assembly in said container having an inlet boss in communication with said interior volume of said container and a discharge boss in said fuel pump aperture in said first end plate, and a third vibration isolating seal means between said discharge boss on said fuel pump assembly and said first end wall of said container operative to prevent fuel leakage from said first passage into said interior volume of said container while substantially preventing transmission of vibrations and pressure pulses to said first end wall.

2. The fuel sender recited in claim 1 wherein:

each of said pair of vibration isolating seal means includes an elastomeric outer ring rigidly attached to said center tube of said filter assembly and a flexible annular lip integral with said outer ring and bearing against a corresponding one of said first and said second tubular bosses, and said third vibration isolating seal means includes an elastomeric outer ring rigidly attached to said second end wall of said container and a flexible annular lip integral with said outer ring bearing against said discharge boss on said fuel pump assembly.

3. The fuel sender recited in claim 2 wherein:

each of said center tube and said end plate and said shell of said filter assembly is made of electrically conductive material connected to a ground circuit of said motor vehicle through a ground conductor.

* * * * *